(12) United States Patent
Kelmartin et al.

(10) Patent No.: US 7,501,356 B2
(45) Date of Patent: Mar. 10, 2009

(54) ARCHITECTURAL FABRIC

(75) Inventors: Thomas Kelmartin, West Chester, PA (US); Thomas Wallace, Rising Sun, MD (US); William Greene, Wilmington, DE (US); Robert Willmann, Port Deposit, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 372 days.

(21) Appl. No.: 11/195,911

(22) Filed: Aug. 2, 2005

(65) Prior Publication Data

US 2007/0032152 A1   Feb. 8, 2007

(51) Int. Cl.
*B32B 5/02*   (2006.01)
*B32B 27/04*   (2006.01)
*B32B 19/02*   (2006.01)

(52) U.S. Cl. .................... 442/86; 442/131; 442/137
(58) Field of Classification Search .............. 442/86, 442/131, 137
See application file for complete search history.

(56) References Cited

U.S. PATENT DOCUMENTS

| | | | |
|---|---|---|---|
| 4,770,927 A | 9/1988 | Effenberger et al. | 428/245 |
| 4,943,473 A | 7/1990 | Sahatjian et al. | 428/245 |
| 4,946,736 A | 8/1990 | Sassa | 428/245 |
| 5,230,937 A | 7/1993 | Effenberger et al. | 428/113 |
| 5,264,276 A | 11/1993 | McGregor et al. | 428/252 |
| 5,357,726 A | 10/1994 | Effenberger et al. | 52/309.7 |
| 5,401,901 A | 3/1995 | Gerry et al. | 174/35 |
| 5,433,996 A | 7/1995 | Kranzler et al. | 428/247 |
| 5,571,605 A * | 11/1996 | Abrams et al. | 442/195 |
| 5,759,924 A | 6/1998 | Sahlin | 442/60 |
| 5,814,405 A | 9/1998 | Branca et al. | 428/311.51 |
| 5,916,659 A | 6/1999 | Koerber et al. | 428/86 |
| 2004/0121677 A1 * | 6/2004 | Jahn et al. | 442/82 |
| 2004/0219851 A1 | 11/2004 | Sahlin et al. | 442/254 |

FOREIGN PATENT DOCUMENTS

| | | |
|---|---|---|
| EP | 0 202 996 A | 11/1986 |
| WO | WO 92 /09429 A | 6/1992 |
| WO | WO 00 02639 | 1/2000 |
| WO | WO 01/96695 | 12/2001 |

\* cited by examiner

*Primary Examiner*—Lynda Salvatore
(74) *Attorney, Agent, or Firm*—Allan M. Wheatcraft

(57) ABSTRACT

An article useful as an architectural fabric consisting of (a) a layer of fabric having a first surface and a second surface made of polytetrafluoroethylene fibers; and (b) a fluoropolymer coating disposed on at least the first surface of the fabric.

7 Claims, 2 Drawing Sheets

ARCHITECTURAL FABRIC

FIELD OF INVENTION

The present invention relates to fabric and, more particularly, to architectural fabric that is waterproof, fire retardant, flexible, durable, and aesthetically pleasing.

BACKGROUND OF INVENTION

Architectural fabric is fabric used as a building structure or part of a building structure. It typically provides protection for humans from elements such as wind, sun, and rain. It may be a permanent structure or a temporary one. If temporary, it may be retractable or removable, for example by folding, rolling, or otherwise storing.

There are several requirements for architectural fabric. It must be strong enough to withstand wind and other stresses during assembly and use. It must be flexible and durable, so that it can be folded or rolled and its strength and integrity are maintained over time. It must be UV light resistant. UV light tends to degrade and weaken fabric over time. A fabric that is UV resistant will stand up under this exposure. It should generally be fire retardant and waterproof. It should be easily seamed (or "welded"). It must also be aesthetically pleasing.

A known architectural fabric is a composite consisting of fiberglass fabric coated with PTFE. Although this product has certain desirable qualities, it is not suitably flexible. The fabric thus cannot be used efficiently in applications where convenient removal of the fabric is needed.

Another known architectural fabric has a coating of PVC or acrylic on polyester fabric. These products have flexibility but only limited durability. Unless specially treated, these fabrics are flammable and tend to degrade under UV light. After a certain amount of flexing and UV exposure, these products develop cracks or other imperfections that allow water to penetrate the fabric at the point where it has been compromised.

Another known architectural fabric is that disclosed in U.S. Pat. No. 6,770,577B2 to Kelmartin et al. The article disclosed therein comprises a polytetrafluoroethylene fabric attached to at least one composite membrane of a porous polytetrafluoroethylene film having a fluoropolymer adhesive (such as THV) contained in its pores. The porous polytetrafluoroethylene film is provided to make the article durable and aesthetically pleasing. Addition of the film requires additional processing, however. The film also tends to mute any pigments or colors in the fabric or the THV.

An economical, weldable, waterproof, fire retardant architectural fabric is needed in the industry.

SUMMARY OF INVENTION

The present invention provides an article consisting of (a) a layer of fabric having a first surface and a second surface made of polytetrafluoroethylene fibers; and (b) a fluoropolymer coating disposed on said first surface of said fabric. In another embodiment, the invention further includes a fluoropolymer coating disposed on the second surface of the fabric. The fluoropolymer coating is preferably THV. The article of the present invention is preferably waterproof, fire retardant, and has high seam strength. It is also preferably an architectural fabric for retractable, temporary, or permanent structures, such as tensile structures, and is adapted to be joined to itself by welding.

In another aspect, the present invention provides a method of making an architectural fabric for a retractable, temporary, or permanent structure by:

(a) providing a layer of fabric having a first surface and a second surface and comprising polytetrafluoroethylene fibers;
(b) disposing THV on the first surface of said fabric; and
(c) optionally disposing THV on the second surface of said fabric.

In another aspect, the invention provides a method of making an architectural fabric comprising the steps of (a) providing a fluoropolymer fabric
(b) extrusion coating the fluoropolymer fabric with THV by simultaneously extruding the THV onto the fabric and nipping the fabric and extruded THV between a first roll and a second roll.

BRIEF DESCRIPTION OF INVENTION

DETAILED DESCRIPTION OF INVENTION

Figure 1:
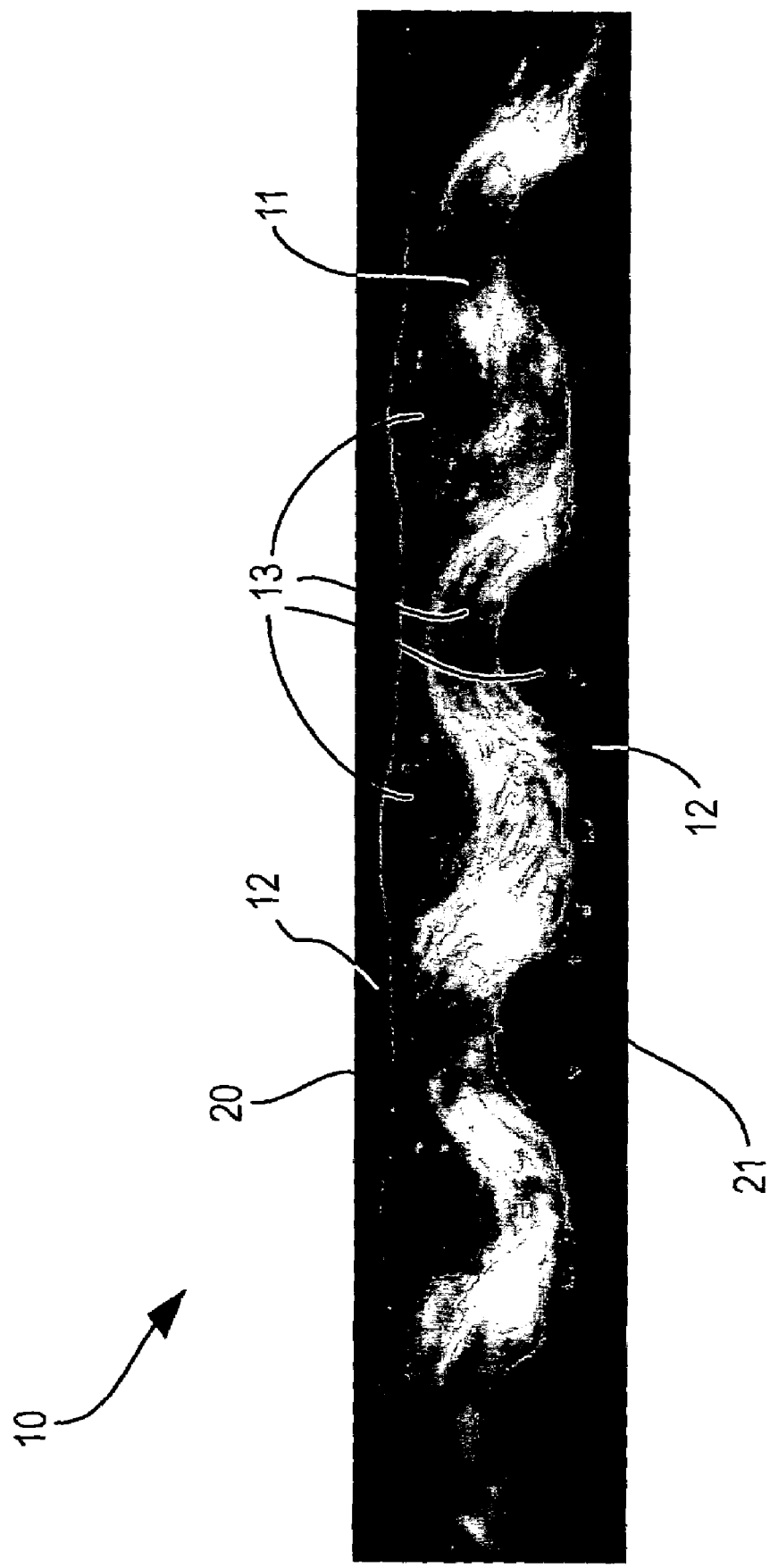
FIG. 1 is an optical micrograph of a cross-section of an article in accordance with an exemplary embodiment of the present invention.

The present invention will now be described with reference to the figures in the drawing. FIG. 1 is an optical micrograph of a cross-section of an article 10 according to an exemplary embodiment of the present invention. In this exemplary embodiment, article 10 is an architectural fabric. Article 10 includes a fabric 11 made of fibers 13 of a fluoropolymer material, preferably PTFE fibers that have sufficient strength for a particular application, and most preferably expanded PTFE fibers. Fabric 11 has a warp and a weft direction, accounting for the cross-sectional views perpendicular to and parallel to the axes of the individual fibers of fabric 11 shown in FIG. 1.

Fabric 11 has a first surface 20 and a second surface 21. Disposed adjacent to first surface 20, which extends along fibers 13 in both the warp and weft direction, and extending in between and among fibers 13 is a fluoropolymer coating 12, preferably a terpolymer of tetrafluoroethylene, hexafluoropropylene, and vinylidene fluoride (THV).

Article 10 is useful as an architectural fabric with only first surface 20 covered by fluoropolymer coating 12. A preferable embodiment, however, also has fluoropolymer coating 12 disposed on second surface 21 (and extending between and among fibers 13 from such second surface 21).

Fabric 11 is any material that is UV light resistant and fire retardant. It must also be strong, flexible and durable. PTFE fiber is preferred. Fabric made from expanded polytetrafluoroethylene fibers is most preferred.

Fluoropolymer coating 12 is a material that is UV light resistant and fire retardant. THV is preferred. This preferred fluoropolymer coating is also advantageously flexible, adherent to the fabric 11 (without being limited by theory, it is believed that the THV is able to encapsulate the fibers of fabric 11 to form a mechanical bond rather than a chemical bond) and clear or translucent. Preferably, the coating on both sides of the fabric is the same material. THV can be filled for functionality, such as color, UV resistance (if needed, for example if no PTFE fabric is used), and flame resistance.

Figure 2:
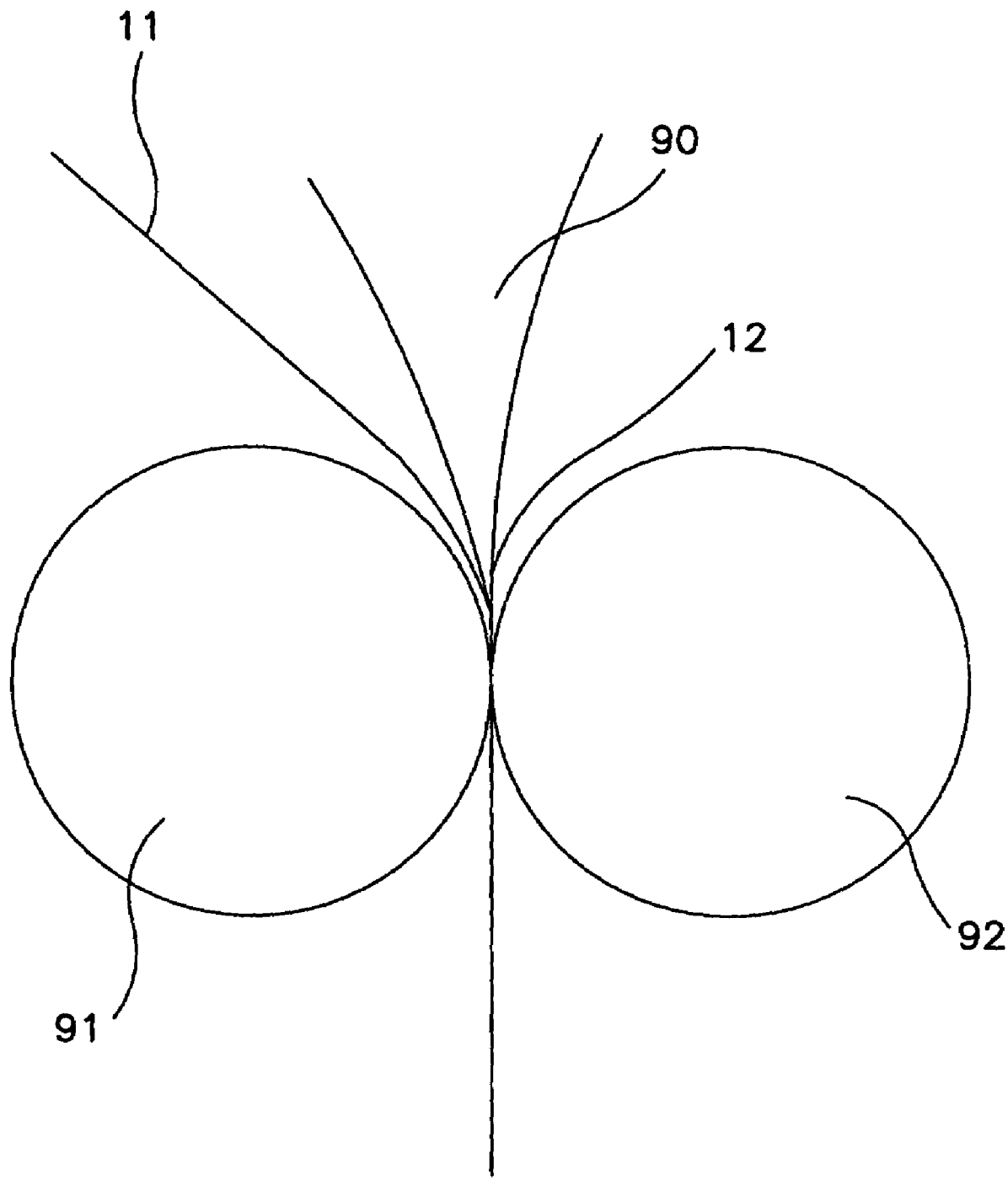
FIG. 2 is a schematic illustration of an exemplary process for making an article according to the present invention.

Fluoropolymer coating 12 is preferably applied to fabric 11 by extrusion coating, although other methods, such as solvent coating or lamination with or without the use of release layers are alternatives. FIG. 2 depicts a preferred extrusion coating process for making the architectural fabric of this invention. Fabric 11 is passed between rolls 91 and 92 while fluoropolymer coating 12 is simultaneously extruded onto fabric 11 from extruder 90. The surfaces of rolls 91 and 92, as well as the temperature and speed of the rolls are critical processing parameters for making the present invention. Details of these parameters are given in the example below.

Surprisingly, Applicant has discovered that the article of the present invention functions well as an architectural fabric. Contrary to the conventional wisdom expressed in U.S. Pat. No. 6,770,577B2 to Kelmartin et al., Applicant has discovered that an architectural fabric made without the PTFE film disclosed in Kelmartin is durable, processable and aesthetically pleasing. As stated in this patent, "[w]hen THV alone is used to coat the fabric, the surface has a blotchy appearance that is tacky. With the inventive article, however, the surface appears uniform and is not tacky. This also provides unexpected improvements in processability. The article does not stick to or coat processing rolls during manufacture." It was thus conventional wisdom before the present invention that elimination of the porous polytetrafluoroethylene film would be undesirable.

Also surprisingly, article 10 can be much more easily seam-sealed to itself using welding techniques known in the art of seam-sealing for example, with PTFE/fiberglass fabrics. This is a result of the elimination of the microporous PTFE element described in U.S. Pat. No. 6,770,577B2. A variety of seaming techniques can be used. A secure seam is formed by applying heat (about 230 degrees C. for 45 seconds) and pressure to overlapped portions of the inventive fabric. A suitable seam sealing device is an electric impulse hot bar welder available from Aline Heat Sealing Corporation, Cerritos Calif., part number HD-25. Surprisingly, radio frequency welding can also be used, as can wedge welding and hot-air welding. Using the invention, one can easily get a strong weld without the need for special processing, or for adding additional adhesives or seam tape as with other fabrics currently used.

The following example is intended to illustrate, but not limit, the present invention.

EXAMPLE

An Architectural Fabric was Prepared as Follows:

THV220 (Dyneon, Inc, Oakdale, Minn.) which was pigmented tan was extruded using a single screw extruder and a slotted die at a temperature of 250C. It was directed vertically downward into a nip created by two rolls; one being a TEFLON®-sleeved EPDM rubber roll and the other a TEFLON®-coated steel roll. The thickness of the extruded film was 175 micrometers. The EPDM roll had a surface temperature of 90 C., and the steel roll had a surface temperature of 115 C. The surface speed of the rolls was 2.75 meters per minute. Fabric woven of expanded PTFE fiber was obtained from W. L. Gore & Associates, Inc. This fabric was woven in a plain weave, 18 ends by 18 picks per centimeter. Each end and each pick yarn was composed of two 500 denier expanded PTFE fibers plied together.

The fabric entered the nip over the steel roll and was pressed against the molten THV220 in the nip. The nip force was 130 Newtons per centimeter. The THV220 was pushed into the voids in the fabric by the action of the nip. The resulting THV220/fabric composite was wound onto a roll at the end of the extrusion line.

The aforementioned THV220/fabric composite was then run a second time on the extrusion line except that a second coating of molten THV220 pigmented red was applied to the fabric face which was not extruded upon in the first pass. The machine conditions were the same for this second pass as they were for the first pass. This material produced in this example was identified as 360-75. The thickness of the THV220/fabric composite was 0.65 millimeters, and the mass per unit area was 1240 grams per square meter.

TESTING

The fabric produced according to the above example was tested for various properties as follows.

(1) Waterproofness

Apparatus:
RO/Distilled water
Thermometer
Low Hydrostatic Pressure Tester (Alfred Suter Co., Ramsey, N.J., Model No. 502 Suter LHPT)
Timer
Water Circulator Test Specimens:
Specimen size: circular sample of 4½" (11.4 cm) diameter.
Specimens per sample: Three.

Conditioning: Condition the specimens at 21±1° C. (70±2° F.), 65±2% RH prior to testing.

Test Procedure:
1. Check the water level in the tank.
2. Add water if the level is too low.
3. Turn the pump on.
4. Check that the water temperature is at 27±3° C. (80±5° F.).
   4.1 Run the motor to heat or add heated water to the tank if the water temperature is too low.
   4.2 Float an ice pack, located in the freezer, in the tank to lower the temperature if the water temperature is too high (or becomes too high while testing), or add cold water.
5. Purge the water lines.
6. Place a specimen face side down under the specimen holder.
7. Clamp the specimen in place.
8. Open the valves to start water flow.
9. Set a timer for 3 minutes.
10. Start the timer when the gauge on the LPHT tester reaches the specified pressure (1.1 psig).
11. Check each specimen for leaks. Samples that leak are reported as failures. Those that do not leak, pass.
    11.1 Failures should only be counted if leaks occur in the test area.
       11.1.1 Drops of water penetrating the specimen at the clamped edge of the specimen or within 0.32 cm (⅛") of this edge shall not be counted.

Three samples of the example material were tested as described above. All three samples passed with no leakage.

(2) Fire Retardance

The example fabric was tested for fire retardance as follows.

Apparatus:
Cabinet including Tirrill Burner
Brass weights
Metal specimen holder and clips
Scissors or hole punch
Specimen mounting block
Butane lighter
Timer (tenths of seconds)
Disposable gloves
Metric ruler (1 mm graduations)

Gas: methane 99% pure
Plastic bag

Test Specimens:
Specimen size: 3"×12" with the 12" length parallel to the test direction.
Number of samples: two.

Conditioning: Condition the specimens at 70±2° F., 65±2% RH prior to testing.

Test Procedure:
1. Cut specimens as specified above.
   1.1. Ensure that the gas pressure is 2.5±0.25 psi.
   1.2. Turn power on (control panel on counter).
   1.3. Turn the pilot knob slightly counter-clockwise, so that it is on.
   1.4. Ignite the pilot with the butane lighter.
   1.5. Adjust the pilot size to ⅛" using the pilot knob. Measure the pilot flame from its lowest point to the tip.
   1.6. Set the flame ignition timer to 120 seconds.
   1.7. Turn the flame/fan knob to flame and burn the flame for at least 2 minutes prior to the beginning of each set up and testing session.
   1.9. Adjust the flame height to 1.5" by turning the knob at the bottom of the burner clockwise to increase the height or counter clockwise to decrease the height. The tip of the flame should reach the top point of the flame indicator.
   1.10. Re-set the flame ignition timer to 12 seconds and re-light the flame.
   1.11. Turn the flame/fan knob to fan.
   1.12. Place the metal specimen holder on the mounting block.
   1.13. Align a dummy specimen in the metal holder with the short edge of the dummy aligned with the lower edge of the holder.
   1.14. Close the specimen holder and clamp with the clips at two places on each side making sure the dummy is smooth and flat in the holder.
   1.15. Turn the flame/fan knob to flame.
   1.16. Light the flame with the butane lighter.
   1.17. Immediately turn the flame/fan knob to off.
   1.18. Position the specimen holder securely in the cabinet.
   1.19. Make sure the holder is positioned in the groove of the holder rest at the back of the cabinet and the middle of the lower edge of the specimen is centered ¾" above the burner.
   1.20. Close the cabinet door and the hood sash.
      Note: The specimen must be tested within 2 minutes of being placed in the cabinet.
   1.21. Turn the flame/fan knob to flame to start the 12-second flame.
   1.22. Once the 12-second flame has extinguished confirm that the pilot light is the proper size.
   1.23. Depress the door release button and allow the cabinet to ventilate for 30 seconds or until all smoke and fumes are removed.
   1.24. Adjust the pilot light, if necessary, and repeat steps 1.15 through 1.24 as needed until proper pilot size is maintained.
2. Testing:
   2.1. Place the metal specimen holder on the mounting block.
   2.2. Align the specimen in the metal holder such that the test area does not contain any identification markings when the short edge of the specimen is aligned with the lower edge of the holder.
   2.3. Close the specimen holder and clamp with clips at two places on each side making sure the specimen is smooth and flat in the holder.
   2.4. Turn the flame/fan knob to flame.
   2.5. Light the flame with the butane lighter.
   2.6. Immediately turn the flame/fan knob to off.
   2.7. Position the specimen holder securely in the cabinet.
   2.8. Make sure that the holder is positioned in the groove of the holder rest at the back of the cabinet and that the middle of the lower edge of the specimen is centered ¾" above the burner.
   2.9. Close the cabinet door and the hood.
      Note: The specimens must be tested within 2 minutes of being place in the cabinet.
   2.10. Turn the flame/fan knob to flame to start the 12-second flame.
   2.11. Determine the after-flame, and after-glow time, and the presence of melting or dripping, after the 12-second flame extinguishes, and record in the lab database.
      2.11.1. After-flame: Using the timer mounted on the hood, measure the number of seconds, to the nearest 0.1 seconds, that the material continues to burn after the igniting flame extinguishes. Do not turn the fan on until the specimen has stopped glowing, regardless of whether or not the after-glow is being measured.
      2.11.2. After-glow: Using the automatic timer, measure the number of seconds, to the nearest 0.1 seconds, that the material glows after the flaming ends. The glow shall not be extinguished even if after-glow time is not being evaluated because of the glow's effect on char length.
      2.11.3. Melt/Drip: Look for signs of melting or dripping.

The example material tested for fire retardance had the following results, illustrating that the material was indeed fire retardant.

|  |  | A | B | C | Average | Standard Deviation |
|---|---|---|---|---|---|---|
| Warp | Afterflame(sec) | 1.3 | 1.2 | 1.2 | 1.23 | 0.05 |
|  | Afterglow(sec) | 0 | 0 | 0 | 0.00 | 0.00 |
|  | Melt/Drip | Melt/No Drip | Melt/No Drip | Melt/No Drip |  |  |
|  | Char Length(cm) | 1.4 | 1.55 | 1.85 | 1.60 | 0.19 |
| Fill | Afterflame(sec) | 1.2 | 1.1 | 1 | 1.10 | 0.08 |
|  | Afterglow(sec) | 0 | 0 | 0 | 0.00 | 0.00 |
|  | Melt/Drip | Melt/No Drip | Melt/No Drip | Melt/No Drip |  |  |
|  | Char Length(cm) | 1.6 | 1.45 | 1.85 | 1.63 | 0.16 |

(3) Seam Strength

Two pieces of the example fabric were placed in overlapping relationship in the warp direction, such that 2.5 inches (6.35 cm) of each piece overlapped. No seam tape was used, nor was any scuffing or abrasion performed on the areas to be welded. The overlap was welded to form a seam with an Aline Welder Model HD-25 at 230 degrees C. for 45 seconds. Strips of the fabric were cut 2 inches (5.08 cm) wide by 14 inches (35.5 cm) long with the long direction perpendicular to the seam. The seam strength was tested by pulling the seam on a tensile tester (Instron Corporation, Norwood Mass., Model 5567) with 4 inch (10.16 cm) gauge length at 2 inches (5.08 cm) per minute extension rate. Five such specimens were produced. The results are tabulated below, and indicate a very strong seam was produced using this simple welding technique on the inventive fabric. A seam having a strength of at least 90% of the nominal strength of the fabric is desired.

| Specimen | Max Force (Lb/2 Inch) | Max Force (Lb/Inch) | Max Force (N/5 cm) | Percent of Nominal Fabric Strength (456 Lb/in - 4000 N/5 cm) |
|---|---|---|---|---|
| 1 | 929 | 465 | 4074 | 102% |
| 2 | 901 | 451 | 3951 | 99% |
| 3 | 868 | 434 | 3806 | 95% |
| 4 | 884 | 442 | 3876 | 97% |
| 5 | 882 | 441 | 3868 | 97% |
| Average | 893 | 446 | 3915 | 98% |
| Std. Dev. | 23.4 | 11.7 | 102.5 | |
| COV | 2.6% | 2.6% | 2.6% | |

While particular embodiments of the present invention have been illustrated and described herein, the present invention should not be limited to such illustrations and descriptions. It should be apparent that the changes and modifications may be incorporated and embodied as part of the present invention within the scope of the following claims.

What is claimed is:

1. An article consisting of:
   (a) a layer of fabric having a first surface and a second surface and comprising polytetrafluoroethylene fibers;
   (b) a THV coating disposed on said first surface and extending between and among said fibers from said first surface, and
   (c) a THV coating disposed on said second surface and extending between and among said fibers from said second surface.

2. An article consisting of:
   (a) a layer of fabric having a first surface and a second surface and comprising polytetrafluoroethylene fibers;
   (b) a THV coating disposed on said first surface and extending between and among said fibers from said first surface,
   (c) a THV coating disposed on said second surface and extending between and among said fibers from said second surface, and
   (d) an additive in one or both of said fluoropolymer coatings.

3. An article as defined in claim 2 wherein said additive is a pigment.

4. An article as defined in claim 2 wherein said fabric comprises expanded polytetrafluoroethylene fibers.

5. An article as defined in claim 2 wherein the article is waterproof.

6. An article as defined in claim 2 wherein the article is fire retardant.

7. An article as defined in claim 2 wherein the article is an architectural fabric for retractable, temporary, or permanent structures.

* * * * *